United States Patent [19]

Hucks

[11] 4,205,698
[45] Jun. 3, 1980

[54] DETACHABLE WATER PIPE FREEZE PREVENTING DEVICE

[76] Inventor: Lemuel C. Hucks, P.O. Box 8, Walthourville, Ga. 31333

[21] Appl. No.: 967,442

[22] Filed: Dec. 7, 1978

[51] Int. Cl.² .............................................. F16K 17/36
[52] U.S. Cl. ................................. 137/62; 73/368.2; 251/63.6; 251/147
[58] Field of Search ................................. 137/59-62; 138/32; 251/147, 63.6

[56] References Cited

U.S. PATENT DOCUMENTS

| | | | |
|---|---|---|---|
| 1,134,882 | 4/1915 | Lowe | 137/62 X |
| 1,200,928 | 10/1916 | Egan | 137/62 |
| 1,526,718 | 2/1925 | Opp | 137/60 X |
| 1,558,276 | 10/1925 | Peterson | 137/62 |
| 1,916,038 | 6/1933 | Cartwright | 137/62 X |
| 2,995,140 | 8/1961 | Managhan | 137/60 |
| 3,320,965 | 5/1967 | Morgan | 137/62 |
| 3,369,556 | 2/1968 | Allderdice | 137/62 |
| 3,380,464 | 4/1968 | Arterbury et al. | 137/60 |
| 3,397,711 | 8/1968 | Strange | 137/62 |
| 3,446,226 | 5/1969 | Canterbury | 137/62 |
| 3,880,180 | 4/1975 | Wismer | 137/60 |
| 4,066,090 | 1/1978 | Nakajima et al. | 137/62 |
| 4,117,856 | 10/1978 | Carlson | 137/62 |

FOREIGN PATENT DOCUMENTS 372965 4/1923 Fed. Rep. of Germany ............. 137/60
202972 3/1925 United Kingdom ..................... 137/62

*Primary Examiner*—Martin P. Schwadron
*Assistant Examiner*—Richard Gerard
*Attorney, Agent, or Firm*—David H. Semmes; Warren E. Olsen

[57] ABSTRACT

An improved device for easy attachment to an external water spigot, which is designed to allow a slight dripping of water when ambient temperatures drop below a point at which there is a danger of water freeze, within house pipes or spigot. The present device has a simple moving valve, or water release shaft, which extends axially between a closed volume of a particular fluid, and a valve seat proximate the connection of the device to the spigot outlet. The improved temperature responsive valve taught herein ensures a most efficient opening function, during temperature drops below approximately 32° F. by employing a closed fluid volume that is unaffected by the temperature of any released water. Further, the particular improvements involve a specially configured liquid chamber piston which ensures a large opening excursion, at desired temperature range.

6 Claims, 7 Drawing Figures

DETACHABLE WATER PIPE FREEZE PREVENTING DEVICE

BACKGROUND OF THE INVENTION

1. Field of the Invention

The present invention is an improved ambient temperature responsive bleed valve, which is compact and easily attachable to an external water faucet for the purpose of allowing water to be bled from the faucet in response to ambient temperature changes below and through a predetermined freeze point. The present invention is primarily a safety device, in that when there is a danger that the water within a household system may freeze, this device automatically relieves the pressure in a dripping fashion, so that freezing and bursting of the pipes of the household system will be avoided. The present invention has particular utility in those areas of the United States where a household water pipe system is not particularly designed for sudden and unexpectedly severe freezing conditions, i.e., where a relatively temperate climate is normal. For example, the Southeastern parts of the United States are particularly vulnerable to severe frosts, since the normally temperate climate of this region does not dictate that water pipes be sufficiently insulated or otherwise protected from ambient conditions to withstand such sudden subfreezing conditions.

The present invention is a particularly simple and economical approach to providing automatic dripping of water from a faucet, in response to sudden freezing conditions, since no user adjustments are either required or possible. Hence, the significant object of the present invention is to provide an improved water drip device which will be both easily attachable to an exterior household water spigot, and also operate effectively without any possibility of breakdown due to user misadjustment or tampering.

2. Description of the Prior Art

Numerous devices are known in the prior art for allowing water within a household system, for example, to be somewhat flowed when there is a danger that ambient temperatures would freeze the pipes of the system. Representative of such prior art approaches known to the applicant are the U.S. Pat. Nos., as follows: Lowe 1,134,882; Egan 1,200,928; Opp 1,526,718; Peterson 1,558,276; Cartwright 1,916,038; Managhan 2,995,140; Morgan 3,320,965; Allderdice 3,369,556; Arterbury, et al. 3,380,464; Strange 3,397,711; Canterbury 3,446,226; Wismer 3,880,180; Nakajima, et al. 4,066,090.

Lowe is noted simply to illustrate an early system approach to the problem of water pipe freezing when a valve is configured to simply respond to a pressure drop, as the result of the constriction of water pressure which is created by a self-contained thermal sensing loop within the water pipe as it enters the house.

Egan illustrates an early freeze release valve construction which depends upon an aneroid spring mechanism, and requires manual resetting after a lever has opened the water line to a bleed position.

The patents to Opp and Cartwright show further water draining devices, and particularly integral valving mechanisms. In Opp, the valve member must be opened against the water pressure, so that drained water is ensured to freely surround the piston which is then moved by the expansion of the water, in a separate chamber.

Cartwright shows a container with a valve which will allow release of liquid from the container, in response to a freeze. Cooling fluid from the container is allowed to freeze in an exterior region, and then simply lift up the valve to relieve the pressure. Both Opp and Cartwright are clearly structurally inappropriate for simple mounting upon a male end of a spigot.

The patent to Managhan illustrates a valve construction, which is dependent upon the fracturing of a glass bottle, under freeze conditions. Managhan illustrates a one-shot device, wherein replacement of a glass bottle is required each time there has been a freeze.

The patent to Morgan illustrates a freeze protection dump valve construction which is configured to respond only to the combined conditions of a lowered line pressure, and a subfreezing ambient temperature. Consequently, Morgan significantly requires that the valve close whenever line pressure is greater than, for example, 10 PSI, despite any state of contraction for the ambient temperature responsive bellows which he employs.

The Allderdice patent illustrates a freeze device having a bellows filled with a liquid, such as water. Expansion of the fluid upon a freeze condition will actuate a valve off its seat, in a direction against the water pressure within a water line. Importantly, Allderdice requires his device to be mounted vertically and in-line with respect to the household plumbing; with by-pass water passing upwardly, through the device, to an ultimate discharge. Finally, Allderdice's device also requires a lost motion adjustment to ensure actuation, in complete distinction to the self-contained and non-adjustable device of the present invention.

The patent to Arterbury, et al. is pertinent to an appreciation of the present invention. Arterbury, et al. illustrates an elongated housing which includes an annual expansion chamber, and further a valve member which is hollowed to allow by-pass water to flow through the valve member to an ultimate discharge. Arterbury critically requires that his longitudinally movable valve member be constructed so the by-pass water will have a heat transfer effect upon the expansion chamber volume. For this purpose, Arterbury requires that a portion of the valve member extend into the household water path, in order to ensure that the thermal response of the expansion chamber is dependent upon the temperature of the household water supply. Further, the Arterbury device requires an in-line mounting to the water line, and he uses a fluid which has a positive coefficient of expansion for decreasing temperatures, unlike the negative coefficient required within the present device.

The patent to Strange illustrates a device for releasing water to prevent freezing, wherein contraction of a thermally responsive element opens the drip valve. While Strange illustrates a dump valve mounted upon a downwardly extending spigot, his valving actuator is a series of wafers configured to have a negative coefficient of thermal expansion in the vicinity of 0° C. The present invention consists of significant improvement upon the approach of Strange, who critically teaches an external screw adjustment in order to ensure valve actuation, and the need for impinging by-pass water directly upon the wafer assembly, so as to override a contraction of the wafer due to simple ambient temperatures.

The patent to Canterbury is also considered pertinent to an understanding of the present invention, since he teaches an automatic device which is adapted for simple mounting on the male end of a spigot. In Canterbury the valve actuation is accomplished by a block of material which contracts upon lowered temperatures, and his block material is located so that the by-pass water will have an enveloping effect upon this thermal member. In distinction, the present invention employs a fluid volume, and does not either allow or lend itself to adjustment or tampering by the user. Moreover, the present invention maintains the volume of actuation fluid independent of water line temperature, so that a functioning reflects only an ambient temperature situation, and not any effects which are localized, due to contact of the drip water on the operating fluid medium.

The patent to Wismer teaches a water pipe freeze valve which employs a floating piston, within an extending housing, whereby expansion of water within the housing raises a piston and snaps open a valve which then opens a separately spaced drain tube. Wismer's construction is, firstly, not adapted to simple mounting on the male end of the spigot and, accordingly, his entire device requires that the piston have a port so that household water from above the piston will be ensured to fill his expansion fluid volume.

Finally, the patent to Nakajima, et al. illustrates a recent patent on a water cock having an integrally mounted non-freezing valve. This device operates on the principle of bringing relatively warmer line water up to the valve. This patent also begins with an ambient, local temperature, but then functions also in response to the household water temperature, reaching the valve.

The above patents represent the prior art as known to applicant, and collectively illustrate various approaches to the design of a freeze relief dump valve. Nonetheless, the present invention is considered to teach considerable improvement over the teachings of this prior art, in that it allows the ambient temperature to control whether or not the valve is open, without regard to a localized temperature increase from warm water being dripped out past the mechanism. The present invention thermally separates the household water supply from the functioning valve. Hence, a freeze condition in a separate part of the water line system will be prevented, even though there might not be a freeze condition within the water line proximate the attached device. Further, the present invention is sealed and does not allow user adjustment or tampering, and the invention significantly includes using a particular class of fluids as the contracting fluid, and a particular construction of fluid piston to ensure maximum excursion of the valve, during the drop through a critical temperature range. Moreover, if the closed volume of fluid is reduced, either through tampering or leakage, the present device is configured so that the valve will remain in an open position, and call attention to its non-functioning condition. In other words, the present invention includes a redundant safety factor, in that if the thermally contracting fluid is not truly filled and closed, the device will malfunction into an open, and therefore, safe position.

SUMMARY OF THE INVENTION

The present invention is an improved ambient temperature responsive bleed valve, which is readily attachable to an external water faucet, or spigot. The invention comprises a simple elongated housing having a proximate end adapted to being engaged upon the outlet of an outdoor water faucet, and a distal end which extends downwardly therefrom. An elongated water release shaft has a first end which functions as a valve member between the water inlet, and the water outlet of the entire device. The water release shaft extends axially within the housing, and is biased to an open position by a spring which surrounds and contacts an annular spring support near the second, or bottom end of the shaft.

The bottom end of the shaft is biased against the upper or proximate end of a piston, which itself is axially movable by the condition of a closed volume of fluid. This closed volume of fluid is located at the distal end of the elongated housing, out of thermal communication with any discharging water released by the valving movement of the water release shaft.

The fluid contained in the closed chamber has a negative coefficient of expansion, for temperature drops through 32° F. In the preferred embodiment, a particular class of oils has been found effective; those with viscosity indices of approximately 107, minimum, and pour points down in the vicinity of $-30°$ F., for example. The preferred fluid is a compressor oil which is rated as a 10W50 oil by its manufacturer Cerfact Laboratories, P.O. Box 988, Tucker, GA 30084. The manufacturer ascribes viscosities of 75 S.U.S. at 210° F., and 425 S.U.S. at 100° F., for this particular product.

Between the contracting closed fluid chamber, (at the distal end of the housing) and the water valving seat (at the proximate end of the housing), there is an intermediate region of the housing which is open to the ambient, through apertures. The intermediate space surrounds the interface between the water shaft and the liquid chamber piston. In the preferred embodiment of the invention illustrated herein, the water release shaft contacts the upper surface of the water release piston with a minimal amount of surface area, in order to eliminate heat transfer effects, between the water shaft and the piston, and also to minimize binding. For example, it has been found that four pie-shaped contact surfaces, on the bottom of the water release shaft, are effective and contribute to consistent operation of the device. In the preferred embodiment the liquid chamber piston is supported for axial movement by a centrally located cylinder. The cylinder extends approximately equally into the intermediate housing space and the closed fluid volume at the distal end of the device. The preferred piston design is open at its distal end to the fluid, with a substantially hollow interior that progressively decreases in cross-sectional area. The selective hollowing is to maximize the axial excursion response. In the preferred embodiment, the liquid piston is hollowed in two stages, whereby a very long and narrow column of fluid is defined within the chamber interior. When the fluid captive in this long and narrow space contracts, in response to a temperature drop, the specific volumetric contractions of such a narrow fluid column creates a relatively larger axial piston excursion downwardly.

Other features and advantages and objects of the present invention will become more apparent from the detailed description which follows, wherein reference is made to the accompanying drawings.

BRIEF DESCRIPTION OF THE DRAWINGS:

FIGS. 3-5 illustrate further views of a water release shaft according to the preferred embodiment wherein FIG. 3 is a vertical plan view, FIG. 4 is a bottom view, and FIG. 5 is a top view;

DESCRIPTION OF THE PREFERRED EMBODIMENT

Figure 1:
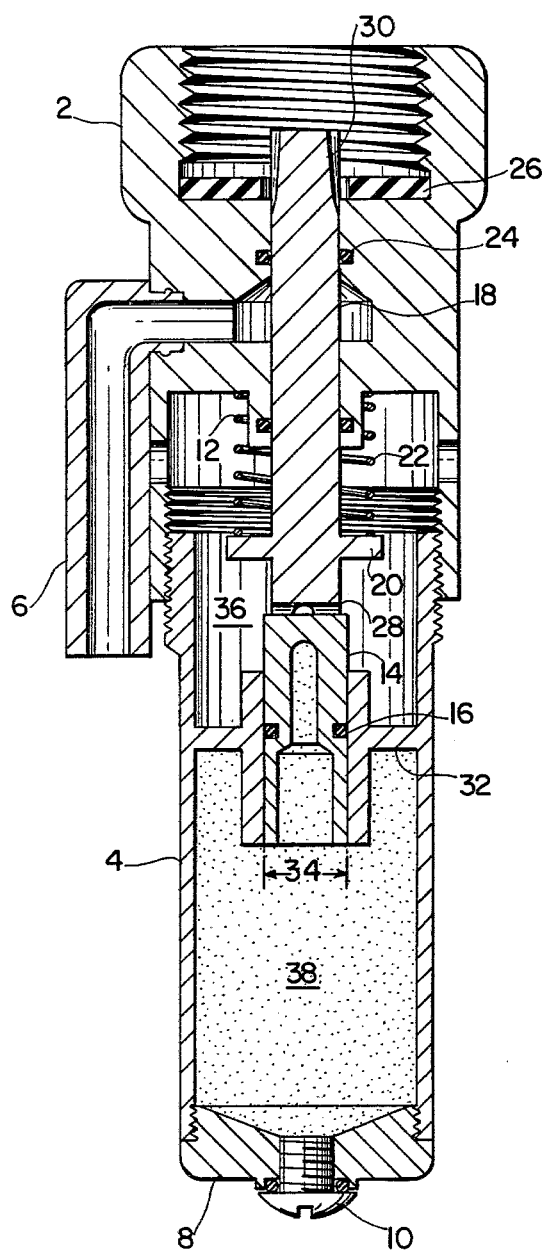
FIG. 1 is a vertical cross-section view of the preferred embodiment of the invention, illustrating all functioning elements.

The preferred embodiment of invention is illustrated in FIG. 1, in vertical cross-sectional view. The preferred embodiment elongated housing has a proximate end adapted to engage upon the outlet of an outdoor water spigot or faucet, in the manner as shown in an elevation view at FIG. 2. The distal end then will extend downwardly. In the preferred embodiment, the housing is defined by an upper valve body, 2, and lower valve body, 4, with a separate water release, 6, being positioned so as to communicate valved water from the proximate end of the housing to the exterior, and out of contact with the housing, or its interior parts. It has been found that using separate upper and lower valve bodies, 2 and 4, respectively facilitates manufacture, though, of course, any other equivalent type of mechanical connection can be employed, within the spirit of the invention. Within the housing there is an axially extending, elongated water release shaft, 18 with a first or upper end, 30, being the valve member between the water inlet and the water outlet of the device. The water release shaft, 18, is biased to an open position by a spring which surrounds and contacts an annular spring support, 20, which is located near the second, or bottom, end of the water release shaft. The first end of the water release shaft valves open upon downward, axial motion, and the first end may preferably include tapered channels, 46, as shown more particularly in FIGS. 3-5.

Figure 5:
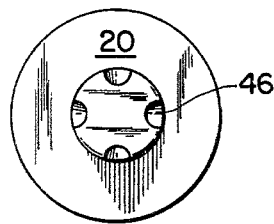
Figure 3:
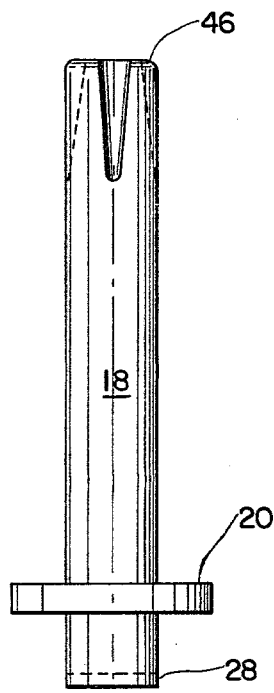
Figure 4:
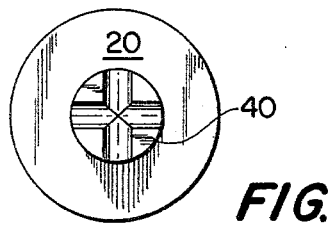

As also shown in the detailed showing of FIGS. 3-5, the preferred embodiment employs a particular shape for the bottom of the water release shaft. A number of reduced area contact surfaces, 40, will interface between the shaft bottom, 28, and the top of a liquid chamber piston, 14. As can be seen most clearly in FIG. 1, a compression spring, 22, surrounds the water release shaft, and biases the elongated piston, 14, held by a centrally located cylinder member, 32. In the preferred embodiment, the cylinder extends approximately equally into an intermediate space of the housing, 36, and into the closed fluid volume, 38, located at the distal end of the housing.

Figure 6:
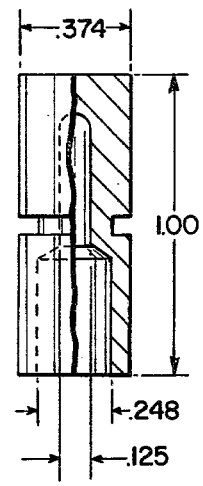
FIG. 6 illustrates a liquid chamber piston, and partial cross-section view, with exemplary dimensions shown thereon.

In this preferred embodiment the housing is divided into three zones, with the upper or proximate zone doing the water valving function, and the distal or lower zone doing the thermal response function. An intermediate section acts both as thermal insulation between the upper and lower sections, and also an area exposed to the ambient air temperatures, as by a plurality of apertures, 50, illustrated particularly in FIG. 2. As shown in FIGS. 1 and 6, liquid chamber piston, 14, then has its upper or proximate end intentionally exposed to an ambient temperature condition, which exists within the air space, 36. Since the compression spring, 22, will bias the piston against the closed fluid volume, 38, any contraction of the closed fluid volume, 38, will be absolutely associated with the downward movement of the elongated liquid piston, 14. It should be appreciated that the cross-sectional area of this cylinder, as dimensioned at 34 in FIG. 1, is substantially less than the total annular cross-sectional area of the closed fluid volume, 38. It has also been found that employing a relatively long and narrow piston, 14, with a hollowed interior portion as shown, contributes to the maximum amount of excursion of the piston, 14, for a given temperature drop. In the preferred embodiment the piston is open and filled with fluid throughout a substantially hollow interior; that progressively decreases in cross-sectional area, up towards the upper end of the piston. Preferred dimensions in inches are shown for this relationship in FIG. 6, and have been found to be extremely satisfactory for this purpose.

It is believed that when the liquid piston is hollowed in this manner, and particularly with progressively decreasing stages as shown, the very long and narrow column of fluid defined within the chamber interior itself contributes immediately to a localized optimization of the downward excursion of the piston, for a given temperature drop. When the fluid captive in this long and narrow space contracts, in response to a temperature drop in the vicinity of the intermediate space of the device, 36, it appears that the specific volume contraction of this narrow column itself creates a relatively large axial piston excursion, in view of the reverse hydraulic advantage of such a long thin column of fluid. The liquid piston is preferrably sealed with an O ring, 16, in a fashion similar to the use of a seal, 24, at the upper end of the water shaft, all as shown in FIG. 1. As shown, any water which flows past the valving surface, 30, into the drain tube, 6, will drip away from the intermediate region 36. There is preferably also provided a second O ring seal, 12, on a mediate portion of the water release shaft.

It should now be appreciated that the device is fail-safe, since any loss of a totally closed and filled volume of fluid at 38, will result in the water release shaft, 30, being urged downwardly, thereby opening the dripping function. Manufacture of this device is facilitated by having a lower valve body cap, 8, together with a fill screw, 10, so that the entire closed volume, 38, can be easily filled, without any air gaps, which could introduce compressibility effect into the operation of the device. It should also be noted that the fluid contained within the enclosed chamber must have a negative coefficient of expansion, through temperature drops below 32° F. (0° C.). While various fluids have been tried, a particular class of oil has been found extremely effective for satisfying the design requirements of this device. For example, the 10W50 compressor oil manufactured by Cerfact Laboratories, herein before discussed, has been found particularly effective, and it is believed that its effectiveness results from its extremely low pour point, which is down in the vicinity of minus 30° F., for example. Any equivalent fluid which will remain pourable, through chilled well below −10° F., and which also contracts consistently as it is being subjected to temperature drops, below 32° F., would be acceptable for the purposes of the present invention.

Figure 7:
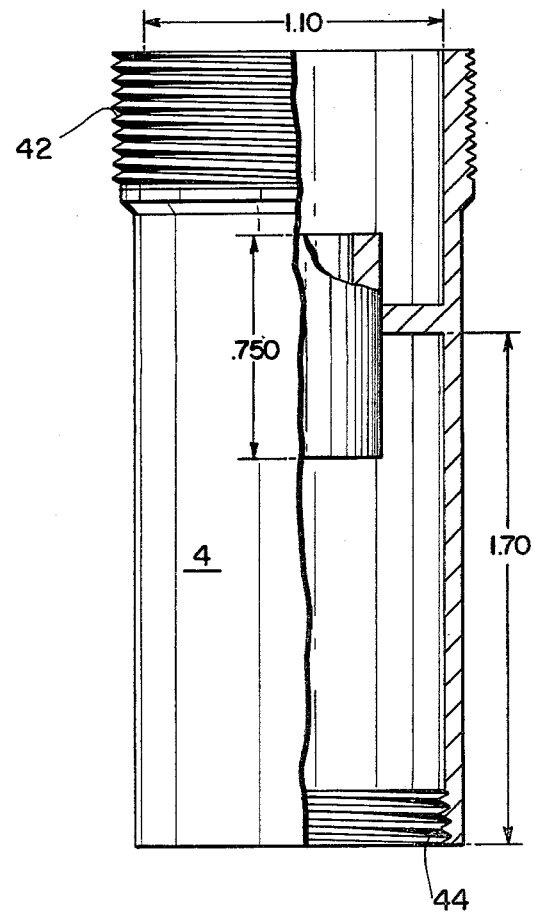
FIG. 7 illustrates a lower valve body of the device, according to the preferred embodiment, also with exemplary dimensions shown thereon.

Relative dimensions are shown in FIGS. 6 and 7 for the preferred liquid chamber piston, and the lower valve body, respectively, since these represent the best mode known to the Applicant for practicing this invention. The dimensions given are in inches, but are also of value for aspect ratios. The piston has a length to width aspect ratio, of approximately 3, and approximately ¼ of its length is normally extending above the suspended cylinder, 32. As shown in FIG. 7, the lower valve body may itself have threads, 42, and 44, to facilitate assembly of this element into the overall combination, after the fashion shown in FIG. 1.

Figure 2:
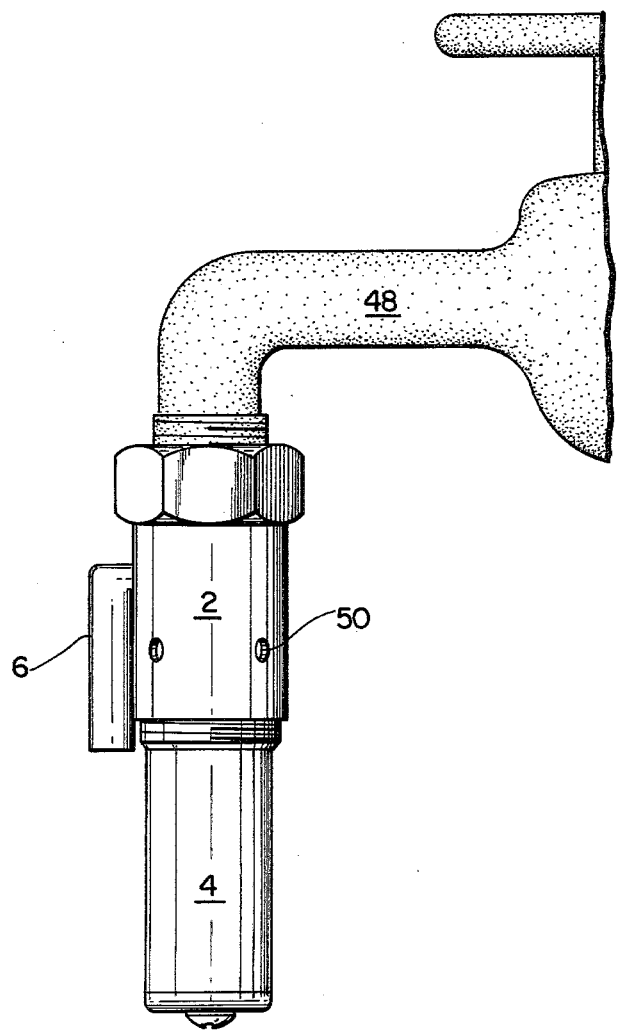
FIG. 2 illustrates an external view of a preferred embodiment of the invention, attached to the end of an external water spigot.

While applicant has described his preferred embodiments with particularity, and shown the best mode of using this device upon a spigot, 48, at FIG. 2, it is to be understood that various modifications and changes could be made without departing from the spirit and the scope of the present invention, and, therefore, the invention should be defined with reference to the scope of the appended claims:

I claim:

1. An improved ambient temperature responsive bleed valve for attachment to a water faucet, comprising:
  A. an elongated housing having a proximate end adapted to be engaged upon the outlet of a water faucet and a distal end extending downwardly therefrom;
  B. an elongated water release shaft extending axially within said housing, said shaft having a first end adapted to valve water into the proximate end of said housing and outwardly therefrom to a drain tube, and a second end biased against the upper end of a piston, said piston being axially movable in response to volume changes in a closed volume of fluid; and
  C. a closed chamber at the distal end of said housing which includes and defines said closed volume of fluid, wherein said piston is constrained for axial movement by a cylinder which is located axially with respect to the housing, wherein the lower end of said piston communicates with said closed fluid volume, and said fluid has a negative coefficient of expansion when subjected to a temperature drop below 32° F., whereby said piston will be urged towards the distal end of said housing during temperature drops below 32° F., and said water release shaft will allow water to pass into the proximate end of said housing, and outwardly from the housing through said drain tube.

2. An improved ambient temperature responsive bleed valve according to claim 1, wherein said piston is axially elongated and includes, at its lower end, fluid access to a substantially hollow interior, wherein said interior progressively decreases in cross-sectional area towards a closed upper end of said piston.

3. An improved bleed valve according to claim 1, wherein said water shaft further comprises an elongated member and said bias is applied by a spring which is in compression between a support on said shaft and an interior surface at the proximate end of said housing, wherein the second end of said water shaft includes a plurality of discrete contact surfaces engaging against the upper end of said piston.

4. An improved bleed valve according to either claims 2 or 3, wherein the valve surface at said first end of said water release shaft extends sealingly through a circular bore and the exterior surface proximate said first end further includes at least one tapered channel, wherein a selective release of progressively larger amounts of water will occur as said closed volume of fluid contracts further, in response to further decreases in ambient temperature.

5. An improved bleed valve according to claim 4, wherein said closed volume liquid is an oil, which has a maximum low temperature pour point which is at least as low as −10° F., and a negative coefficient of expansion during temperature drops from 32° F. and there below.

6. An improved bleed valve according to either claim 2 or 3, wherein said piston is located within a cylinder that extends axially and is supported by an annular cross-wall that also defines an upper boundary for said closed volume of fluid, wherein further said piston upper end is exposed to temperatures within an intermediate portion of said housing, with the housing walls for said intermediate portion including apertures to communicate ambient temperatures to within said intermediate housing portion.

* * * * *